United States Patent [19]

Ballard et al.

[11] Patent Number: 4,798,742

[45] Date of Patent: Jan. 17, 1989

[54] POLYAROMATICS

[75] Inventors: Denis G. H. Ballard, Runcorn; Paul A. Holmes, Malpas; Alan Nevin, Nr Warrington; Ian M. Shirley, Weaverham; David L. Twose, Tarporley, all of England

[73] Assignee: Imperial Chemical Industries PLC, London, England

[21] Appl. No.: 39,735

[22] Filed: Apr. 20, 1987

[30] Foreign Application Priority Data

Apr. 23, 1986 [GB] United Kingdom ................. 8609936

[51] Int. Cl.$^4$ .......................... B05D 3/12; B05D 3/02
[52] U.S. Cl. .................................... 427/240; 427/379; 427/385.5; 528/481; 528/503
[58] Field of Search ..................... 427/240, 379, 389.7, 427/385.5, 226; 528/481, 503

[56] References Cited

U.S. PATENT DOCUMENTS 4,476,296 10/1984 Ballard et al. ...................... 528/503

FOREIGN PATENT DOCUMENTS 0122079 10/1984 European Pat. Off. .
0125767 11/1984 European Pat. Off. .

OTHER PUBLICATIONS

The Condensed Chemical Dictionary, 6th ed, Rheinhold, N.Y. 1961, p. 749.

Primary Examiner—Janyce Bell
Attorney, Agent, or Firm—Cushman, Darby & Cushman

[57] ABSTRACT

A process for the preparation of a polyphenylene layer which comprises the steps of treating a copolycyclohexa-3,4-diene under first conditions to aromatize a portion of the aromatic rings and then under second conditions to aromatize the residual cyclohexadiene rings from the first treatment.

10 Claims, No Drawings

POLYAROMATICS

This invention relates to polymers containing in-chain aromatic residues, particularly to polyphenylene, to a process for the preparation thereof and to the use thereof as films or coatings.

In our European Patent Specifications Nos. 76605 and 107895, there are described certain processes for the preparation of polyphenylene from certain poly(1,2-disubstituted-cyclohexa-3,5-dienes), which are defined therein. In the aforesaid processes, the certain poly(1,2-disubstituted-cyclohexa-3,5-diene) is heated, typically in the solid state in an inert atmosphere, at a temperature in the range 300° C. to 400° C., preferably in the presence of a basic catalyst.

In our European Patent Specifications Nos. 125767 and 122079, there are disclosed processes for preparing coatings which comprise a polyphenylene. The first step in the processes disclosed therein is the deposition of a first coating of a poly(1,2-disubstituted cyclohexa-3,5-diene) from a solution thereof in a suitable solvent, e.g. chlorobenzene, dioxan, chloroform, diglyme, 1,2-dichloroethane or tetrachloroethane. The first coating is then converted by a certain heat treatment into a second coating which, it is reported, comprises polyphenylene.

We have now found that the aforesaid process can be adapted such that the conversion step is carried out in at least two stages. The first stage is carried out by heating a solution of certain poly(1,2-disubstituted cyclohexadienes) in a suitable solvent therefor. The molecular weight of a partially aromatised intermediate prepared thereby (hereinafter referred to for convenience as "solution intermediate"), at any percentage conversion up to about 80% conversion, e.g. about 40% conversion, say, tends surprisingly, we have found, to be about at least ten times more than that of the partially aromatised intermediate of the same per-centage conversion which has been prepared by aromatising a sample of the same starting material in the art process (hereinafter referred to for convenience as "solid-state intermediate").

We have found that the aforesaid increased molecular weight surprisingly tends to be maintained during a later stage of conversion, i.e. conversion of the solution intermediate into polyphenylene. Thus, properties of the polyphenylene which depend on maximum conjugation length, e.g. electrical conductivity, may be improved.

At the aforesaid later stage in the conversion, the solution intermediate, in a substantially dry solid state, is subjected to an appropriate treatment which may be thermal or photochemical. For example, it is heated at a higher temperature, e.g. above about 300° C., or, where appropriate, is irradiated with suitable electromagnet irradiation, e.g. UV light. Often by increasing the per-centage of aromatisation obtained in the solution step, the molecular weight of the polyphenylene after the solid state step is increased.

By "per-centage conversion" we mean the percentage of cyclohexene units in the polycyclohexadiene which have been converted into phenylene units; e.g. by "40% conversion" we mean that 40 out of every 100 cyclohexene units in the polycyclohexadiene have been converted into phenylene.

Accordingly, a first aspect of the present invention provides a process for the preparation of a polyphenylene layer which process comprises the steps of treating a copolycyclohexa-3,5-diene under first conditions such that a portion of the rings are aromatised and then under second conditions such that the residual cyclohexene rings are aromatised.

A preferred aspect of the present invention provides a process for the preparation of a polyphenylene layer which process comprises at least the steps of (A) heating a solution of a poly 1,2-disubstituted-cyclohexa-3,5-diene) in a suitable polar aprotic solvent to a temperature in the range 80° C. to 350° C. such that conversion of a portion of the cyclohexene rings into phenylene rings is effected;

(B) depositing a layer of the solution intermediate from Step A; and (C) treating the aforesaid layer such that conversion of the solution intermediate into polyphenylene, is effected.

In the aforesaid Step A, it is preferred that the highest per-centage conversion is effected and that the solution intermediate remain in solution. Typically, about 30-80% conversion is effected.

As examples of suitable 1,2-substituents which may be present in the polycyclohexadiene used in the process according to the first aspect of the present invention may be mentioned inter alia esters, for example, of alkanoic acids, e.g. acetic, pivalic or oxalic acid, aromatic acids, e.g. benzoic or p-nitrobenzoic, or cyclic lactones; and carbonates, e.g. 1,2-dialkyl carbonates, 1,2-biscarbonates or thiocarbonates.

Poly(1,2-disubstituted-cyclohexa-3,5-diene)s suitable for use in the present invention and conditions for the conversion thereof into polyphenylenes by known processes are more fully described in our aforesaid European Patent Specifications Nos. 76605 and 107 895, the disclosures in which specifications are incorporated herein by way of reference.

Preferably, a portion of the 1,2-substituents on the cyclohexene residues are chosen such that inter alia such rings do not aromatise under the conditions employed in the step A and such rings increase the solubility of the solution intermediate. For example, such rings may be substantially inert to the conditions employed in the aforesaid step A, e.g. acetate, benzoate or pivalate substituents; alternatively, they may react under the conditions employed in step A to generate second substituents which do not aromatise under the aforesaid conditions, e.g. cyclocarbonates.

Preferably, the conditions employed in step A are at least slightly basic. This basicity may be due to the particular solvent employed, e.g. N-methyl-pyrrolidone, although it is often preferred to add a suitable base, which may be an inorganic alkali or more preferably an organic amine, for example as disclosed in our European Patent Specification No. 107,895, e.g. tri-n-octylamine or 1,4-diazabicyclo[2,2,2]octane. For example, where the 1,2-substituents are each lower alkyl, e.g. methyl, carbonates; in step A, a portion of the cyclohexadiene rings aromatise by base catalysis and a portion form cyclic-1,2-biscarbonates, which are not susceptible to catalysis and are believed to increase the solubility of the solution intermediate; in step C, the cyclocarbonate groups absorb UV light, where UV light is used, and aromatise by, it is believed, a so-called Norrish Type II reaction.

Where the poly(1,2-disubstituted cyclohexa-3,5-diene) used in the aforesaid step A is a random copolymer which comprises both 1,2-dialkylcarbonate residues and UV-reactive residues, e.g. 1,2-di-p-nitrobenzoate residues, most of the alkyl carbonate groups tend to aromatise in step A and a portion are converted into cyclocarbonates. The p-nitrobenzoate residues tend to increase the solubility of the product of step A, i.e. the solution intermediate. The aforesaid random copolymer may be represented by the general formula

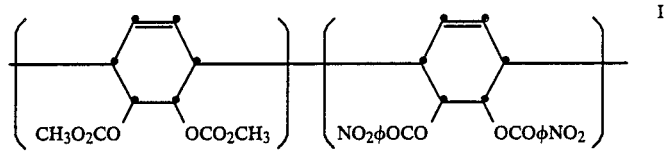

I where φ is a phenylene group. The soluble solution intermediate, which may be represented by the general formula

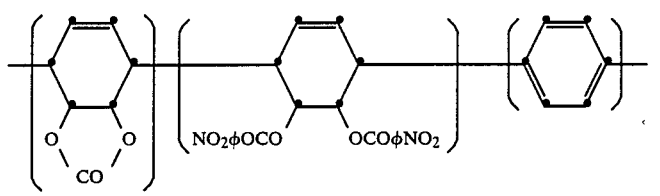

II tends to be more soluble than analogues in which the 1-2-p-nitrobenzoate substituents are not present. This improvement in solubility facilitates the preparation of coatings by known deposition processes in Step B. The non-aromatic units in general formula II can often be induced to aromatise in the solid state in Step C by irradiation with suitable UV radiation.

The suitable polar aprotic solvents for use in the preferred aspect of the present invention have a boiling point above about 150° C. and preferably are slightly basic. As examples of suitable polar aprotic solvents may be mentioned inter alia quinoline, isoquinoline, carbazole or preferably N-methyl-pyrrolidone.

Moreover, the solution intermediate often surprisingly remains soluble at high per-centages, e.g. up to about 60% say, of aromatisation in good solvents therefor. As examples of the aforesaid good solvents may be mentioned inter alia chloroform and quinoline. Solutions of the solution intermediate in a good solvent can then be used to deposit, e.g. by spin coating, coatings of the solution intermediate on a substrate, e.g. a silicon wafer. The aforesaid coating may then be heated, for example, at about e.g. 320° C., as in aforesaid step C to afford a coating of polyphenylene.

Without detriment to the invention we believe that base catalysed aromatisation of cyclo-hexene rings bearing 1,2-dialkylcarbonate residues is an autocatalytic process; the presence of an in-chain aromatic residue in a chain of such 1,2-dialkylcarbonate- substituted cyclohexene rings increases the propensity of adjacent non-aromatic residues to aromatise such that aromatisation of the aforesaid residues tends to "zip" along the chain. Where the aromatic segments produced by such so-called zipping reach a critical sequence length they associate by π—π interactions and effectively "crystallise". This causes agglomeration of the polymer chains and precipitation results. Thus, the maximum percent aromatisation that can be achieved in Step A while maintaining the polymer in solution tends to be determined by inter alia the formation of long aromatic sequences and the propensity of such sequences to agglomerate.

We have now found that where a homopolymer of 1,2-dialkylcarbonatocyclohexa-3,5-diene is used in Step A in the process according to the preferred aspect of the present invention the aromatic sequences formed by the hereinbefore described zipping mechanism tend to be terminated by the formation of cyclic carbonate residues. Such residues are not aromatised under the conditions employed in Step A; they do not "activate" adjacent non-aromatic residues and hence aromatisation does not proceed. The presence of these cyclic carbonate residues thus limits the length of the aromatic sequence. This reduces the tendency of the aromatic sequences to agglomerate and increases the solubility of the solution intermediate.

We have found that the presence of cyclic carbonate groups in the solution intermediate prepared in the process according to the preferred aspect of the the present invention can be increased if the poly(1,2-dialkylcarbonatocyclohexa-3,5-diene) is heated in Step A with certain metal halides, e.g. cesium iodide, potassium bromide or preferably thallium bromoiodide. Such solution intermediates, with enhanced cyclic-carbonate residues, are often more soluble at equivalent percentage conversion than those produced in the absence of a metal halide.

Accordingly, in a preferred embodiment of the aforesaid preferred aspect of the present invention the reaction mixture used in Step A thereof comprises a certain metal halide as hereinbefore defined.

Furthermore, we have found that where a random copolymer, which comprises a majority of units which are aromatisable under the conditions employed in Step A and a minority of units which are not aromatisable under such conditions, is treated in Step A the copolymer remains in solution to a greater percentage conversion to aromatic residues than would be expected for a homopolymer of the aforesaid majority units. Without detriment to the invention, we believe that the presence of the non-aromatisable minority inhibits or prevents the formation of long sequences of aromatic residues and hence reduces the tendency of solution intermediate to agglomerate and precipitate.

We have found that such copolymers can often be treated under basic conditions in solution to give a soluble solution intermediates at up to about 70 mole % conversion and dispersions of solution intermediates at up to about 85 mole % conversion. In such dispersions, the dispersed particles of solution intermediate often have a diameter of about 1 micron. For a homopolymer of 1,2-dialkylcarbonatocyclohexa-3,5-dienes, the solution intermediate tends to become insoluble at above about 40 mole % conversion.

Furthermore, we have found that where a random copolymer, which comprises units which are aromatisable under the conditions employed in Step A (hereinafter referred to for convenience as "X") and units which, when in the form of a homopolymer, are not aromatisable under such (hereinafter referred to for convenience as "Y"), is treated in Step A, the solution intermediate comprises a greater percentage of phenylene units than would be expected by aromatisation of a homopolymer of the aforesaid X units. Thus, where a copolymer derived from 1,2-dimethylcarbonato-cyclohexa-3,5-diene and 1,2-acetoxy-cyclohexa-3,5-diene in 1:1 mole ratio is treated in Step A, e.g. by refluxing in N-methyl-pyrrolidone for about 6 hours, the solution intermediate often comprises about at least 73% of the aromatic residues. Where a homopolymer of 1,2-diacetoxy-cyclohexa-3,5-diene is treated under the aforesaid conditions, no aromatisation is observed. Without detriment to the invention, we believe that in the case of the aforesaid random copolymer, aromatic residues, from the base catalysed conversion of 1,2-dimethylcarbonato-cyclohexa-3,5-diene, catalyse aromatisation of adjacent 1,2-diacetoxy-cyclohexa-3,5-diene units.

It is often preferred that the aforesaid Y units comprise substituted -cyclohexadiene residues whch can be converted photochemically into aromatic residues. As examples of such units may be mentioned inter alia the p-nitrobenzoate and cyclocarbonate derivatives of 1,2-dihydroxycyclohexa-3,5-diene. Where such photo-reactive units are present, Step A involves a low temperature base catalysed aromatisation of the X-units in solution; deposition of a coating e.g. by spin-coating, of the solution intermediate is then effected in Step B; aromatisation to polyphenylene in Step C is effected by a low temperature photochemical reaction.

The layer which is deposited in the aforesaid ste B is preferably deposited as a coating or film on a suitable substrate.

Examples of suitable substrates, and materials therefor, are disclosed in our aforementioned European Patent Specifications Nos. 125767 and 122079. The disclosures in which specifications are incorporated herein by way of reference.

The deposition step in the process according to the preferred aspect of the present invention is preferably carried out by a spin-coating technique, although we do not exclude the possibility that alternative coating techniques known in the electronics art may be used.

The concentration of the solution of poly(1,2-disubstituted-cyclohexa-3,5-diene) used in step A of the process according to the preferred aspect of the present invention is often between 1% w/w and 30% w/w, preferably is between 5% w/w and 20% w/w, and more preferably is about 15% w/w.

The thickness of the coating of poly (1,2-disubstituted-cyclohexa-3,5-diene) prepared in step B of the process according to the preferred aspect of the present invention is typically between 400 Angstroms and 15 microns.

Step C in the process according to the preferred aspect of the present invention is preferably effected by heating, or more preferably by irradiating with UV light, e.g. using a high pressure mercury diffusion lamp, the coating of the solution intermediate.

The weight loss on converting a coating of the solution intermediate to polyphenylene is substantially less than the weight loss on converting an equivalent coating of the poly(1,2-disubstit-cyclohexa-3,5-diene) (for an intermediate of 73% conversion:32% weight loss; compared to 67% weight loss). Thus, the volume contraction on carrying out the aforesaid Step C is less than the volume contraction on converting a coating of poly(1,2-disubstituted-cyclohexa-3,5-diene) into polyphenylene and hence the tendency of the coating to crack during cure is reduced.

Furthermore, where solution intermediates of high conversion, for example greater than about 75%, form dispersions as hereinbefore described, such dispersions can be usefully applied to substrates by conventional paint technology such that coatings are produced. Such coatings can be aromatised to polyphenylene with small weight loss, e.g. 20% weight loss for a solution intermediate of about 84% conversion.

The invention is illustrated, but not limited, by the following Examples.

EXAMPLE 1

A solution of 15 wt % poly(1,2-dimethylcarbonatecyclohexa-3,5-diene) in N-methylpyrrolidone was stirred under nitrogen at 150° C. for 150 minutes. The aromatisation reaction was then stripped and the solution intermediate was recovered by precipitation into a large excess of methanol; it was filtered and dried. The molecular weight (weight average polystyrene equivalent molecular weight) of the solution intermediate was found to be 120,000 compared with 140,000 (determined by GPC analysis using chloroform as solvent) for the aforesaid poly(substituted-cyclohexadiene). Thermogravimetric analysis (TGA) at 10° C./min to 400° C. revealed that the solution intermediate suffered a weight loss of 55% on complete conversion into polyphenylene. This indicated that the solution intermediate initially contained 40 mol % aromatic units since the weight loss required to fully aromatise the polycyclohexadiene is 67 mol %.

In a comparative Test, a similar sample of poly(1,2-dimethylcarbonate cyclohexa-3,5-diene) was aromatised in the solid state to a solid-state intermediate of 40 mol % conversion by heating at 250° C. for 80 minutes. This solid-state intermediate also gave a 55% weight loss on complete conversion into polyphenylene. GPC analysis under the aforesaid conditions revealed that the molecular weight of the solid-state intermediate was 14,000 and 140,000 for the initial polycyclohexadiene.

Solutions of both the 'solution intermediate' and the 'solid state intermediate' described above were cast onto KBr discs. These intermediates were then further aromatised from the 40 mol % aromatic content by heating at 320° C. for 6 hours. The infra red spectra of the resulting samples showed no absorption in the region of 1751 cm$^{-1}$, indicating substantially complete conversion of the initial dimethyl carbonate residues to aromatic units. Bands were, however, detected at around 805 cm$^{-1}$ which is typical of p-substituted phenylene rings, and 695 cm$^{-1}$, which is typical of monosubstituted phenylene rings. The ratio of these two bands provided an indication of the end group (i.e. monosubstituted) content of the polymer, which it will be appreciated, is inversely related to molecular weight. The ratio of the 805:695 cm$^{-1}$ bands in the polyphenylene from the solution intermediate was found to be 0.10 and 0.20 for polyphenylene prepared in the solid state. Comparison of the ratios indicated that the "solution"-prepared polyphenylene is of higher molecular weight than the solid-state polyphenylene.

EXAMPLE 2

A sample of a 10% w/v solution of poly(1,2-dimethylcarbonatocyclohexa-3,5-diene) (weight average molecular weight:160,000; polydispersity:1.2) in N-methyl pyrrolidone was heated at 160° C. for 70 minutes. About 30% of the cyclohexene groups in the starting polymer were shown by infra-red analysis to have been aromatised.

The solution intermediate was spin-coated onto a clean silicon wafer under the conditions described in European Patent Specification No. 163392. The solvent was evaporated in an oven at 120° C. for 1 hour to leave a first coating (3.3 microns thick). This first coating was heated at 320° C. for 6 hours under nitrogen by the process described in the aforesaid European Patent Specification and a second coating was obtained. A weight loss of 57% was observed, on conversion of the first into the second coating.

Infra-red spectra analysis of the second coating in the about 810 cm$^{-1}$ and 695 cm$^{-1}$ regions, which are indicative of para-disubstituted phenylene and mono-substituted benzene respectively, was carried out.

In a comparative test, a further sample of the aforesaid 10% w/v solution was spin coated onto a clean silicon wafer as described above to afford, after evaporation, a coating (3 microns thick). This coating was converted into polyphenylene as described above. A weight loss of 67% was observed.

Analysis of the products of Example 2 and the Comparative Test are shown in Table 1.

TABLE 1

| Example No | Weight loss (%) | Infra-red Analysis A810/A695 |
|---|---|---|
| CT2 | 67 | 14 |
| 2 | 57 | 18 |

CT2 Comparative Test

From Table 1, it can be seen that the product of Example 2 has a higher degree of polymerisation than the product of the Comparative Test. Furthermore, the weight loss and hence volume contraction was about 10% less; which would be expected (a) to generate less mechanical stress in the coating and (b) to reduce the amount cracking on application of strain compared with the product of the Comparative Test.

EXAMPLE 3

A sample of a 10% w/v solution of a random copolymer of 1,2-dimethylcarbonatocyclohexa-3,5-diene and 1,2-diacetoxycyclohexa-3,5-diene, in a mole ratio of 1:1, in N-methyl-pyrrolidone was refluxed under nitrogen at about 220° C. for 6 hours. It was allowed to cool and a sample of the solution was spin-coated onto a silicon wafer under the conditions described in Example 2. Infra-red analysis of the layer revealed that 73% of the cyclohexene residues in the polymer had been aromatised. The coating was further aromatised by heating under nitrogen at 320° C. for 6 hours; a total weight loss of 32% was observed.

In a comparative Test, a further portion of the aforesaid solution was converted into polyphenylene under the conditions described for the comparative test in Example 2. The weight loss was 64%. The resulting polyphenylene coatings were examined by infra-red analysis and the results are shown in Table 2.

TABLE 2

| Example No | Weight loss (%) | Infra-red Analysis A810/A695 |
|---|---|---|
| 3 | 32 | 33 |
| CT3 | 64 | 14 |

CT3: Comparative Test

EXAMPLE 4

A copolymer (60:40 molar ratio) of 1,2-dimethyl-carbonatocyclohexa-3,5-diene and 1,2-diacetocyclohexa-3,5-diene was treated as in Example 3.

On cooling the reaction mixture, a colloidal dispersion of the solution intermediate(approximately 84% aromatised) in NMP was obtained, the particles of which were found, by photon correlation spectroscopy, to have a diameter of 0.13 microns.

A sample of the dispersion was spin-coated onto a silicon wafer and aromatised at 320° C. for 6 hours.

In a comparative test, a sample of the aforesaid copolymer was aromatised under the condition described in Example 2.

The results are shown in Table 3

TABLE 3

| Example No | Weight loss (%) | Infra-red Analysis A810/A695 |
|---|---|---|
| 4 | 20 | 44 |
| CT4 | 63 | 14 |

CT3: Comparative Test

From Table 3 it can be seen that the product of Example 4 has a degree of polymerisation which is more than three times greater than that of the product of the Comparative Test.

We claim:
1. A process for the preparation of a polyphenylene layer which process comprises at least the steps of:
   (a) heating a solution of a poly(1,2-disubstituted-cyclohexa-3,5diene) in a suitable solvent therefor under first conditions such that a portion of the cyclohexene rings are aromatized:
   (b) depositing a layer of the partially aromatized solution intermediate from step A onto a suitable substrate; and then
   (c) treating the aforesaid layer under second conditions such that the residual cyclohexene rings are aromatized.

2. A process for the preparation of a polyphenylene layer which process comprises at least the steps of:
   (a) heating a solution of a poly (1,2-disubstituted-cyclohexa-3,5-diene) in a suitable polar aprotic solvent to a temperature in the range of 80° C. to 350° C. such that up to about 80% of the cyclohexene rings are aromatised;
   (b) depositing a layer of the partially aromatised solution intermediate from step A onto a suitable substrate; and
   (c) treating the aforesaid layer such that conversion of the partially aromatised solution intermediate into polyphenylene is effected.

3. A process as claimed in claim 2 wherein the 1,2-substituents of the poly (1,2-disubstituted-cyclohexa-3,5-diene) are ester or carbonates or both.

4. A process as claimed in claim 3 wherein at least a portion of the esters are derived from p-nitrobenzoic acid.

5. A process as claimed in claim 3 wherein at least a portion of the carbonates are 1,2-biscarbonates.

6. A process as claimed in claim 2 wherein the concentration of the poly (1,2-disubstituted-cyclohexa-3,5-diene) in the suitable polar aprotic solvent is between 1% w/w and 40% w/w.

7. A process as claimed in claim 2 wherein the suitable polar aprotic solvent is N-methyl-pyrrolidone.

8. A process as claimed in claim 2 wherein the solution used in step (A) comprises a metal halide.

9. A process as claimed in claim 8 wherein the metal halide is thallium bromoiodide.

10. A process as claimed in claim 2 wherein the deposition is carried out by a spin-coating technique.

* * * * *